(12) United States Patent
Baseley et al.

(10) Patent No.: US 8,933,968 B2
(45) Date of Patent: Jan. 13, 2015

(54) ENTERTAINMENT DEVICE, SYSTEM, AND METHOD

(75) Inventors: Nathan James Baseley, London (GB); Nicolas Doucet, London (GB)

(73) Assignee: Sony Computer Entertainment Europe Limited (GB)

( * ) Notice: Subject to any disclaimer, the term of this patent is extended or adjusted under 35 U.S.C. 154(b) by 576 days.

(21) Appl. No.: 13/318,884

(22) PCT Filed: Apr. 30, 2010

(86) PCT No.: PCT/GB2010/050720
§ 371 (c)(1), (2), (4) Date: Dec. 29, 2011

(87) PCT Pub. No.: WO2010/128321
PCT Pub. Date: Nov. 11, 2010

(65) Prior Publication Data
US 2012/0086729 A1  Apr. 12, 2012

(30) Foreign Application Priority Data

May 8, 2009 (GB) .................................. 0907962.5

(51) Int. Cl.
*G09G 5/00* (2006.01)
*G06T 19/00* (2011.01)
(Continued)

(52) U.S. Cl.
CPC ............... *G06T 19/00* (2013.01); *G06F 3/011* (2013.01); *G06F 3/017* (2013.01); *G06T 13/20* (2013.01);
(Continued)

(58) Field of Classification Search
CPC ....... G06T 19/006; G06T 19/00; G06F 3/011; G06F 3/012; G02B 27/017
See application file for complete search history.

(56) References Cited

U.S. PATENT DOCUMENTS

| 6,772,195 B1 * | 8/2004 | Hatlelid et al. ............... 709/204 |
| 2002/0094189 A1 * | 7/2002 | Navab et al. ................... 386/4 |

(Continued)

FOREIGN PATENT DOCUMENTS

WO    99/34276 A2    7/1999

OTHER PUBLICATIONS

International Search Report and Written Opinion, PCT/GB2010/050720, dated Feb. 1, 2011.

(Continued)

*Primary Examiner* — Kee M Tung
*Assistant Examiner* — Michelle Chin
(74) *Attorney, Agent, or Firm* — Lerner, David, Littenberg, Krumholz & Mentlik, LLP

(57) ABSTRACT

An entertainment device generates a composite image with a combiner that combines camera-captured images with a computer-generated image of an object resting on a virtual surface. The device also includes a detector that detects image movement in the captured images in one or more contact point regions corresponding to image positions at which the object contacts the virtual surface. The device further comprises an initiator for initiating movement of the object to a new position with respect to the virtual surface in response to detected motion in the contact point regions. The detector detects whether a first image area corresponding to a captured image feature is greater than a predetermined proportion of a second image area corresponding to a full field of view of the camera. If the first image area is greater than the predetermined proportion, the initiator initiates movement of the object to an avoidance position.

15 Claims, 13 Drawing Sheets

(51) Int. Cl.
*G06F 3/01* (2006.01)
*G06T 13/20* (2011.01)

(52) U.S. Cl.
CPC ....... *G06T 19/006* (2013.01); *A63F 2300/1093* (2013.01); *A63F 2300/6045* (2013.01); *A63F 2300/8058* (2013.01)
USPC .......................................... 345/633; 345/634

(56) References Cited

U.S. PATENT DOCUMENTS

2006/0104487 A1* 5/2006 Porter et al. ................... 382/118
2007/0222864 A1* 9/2007 Hiraga et al. .............. 348/208.4
2009/0017909 A1 1/2009 Yamada
2013/0246576 A1* 9/2013 Wogsberg et al. ............ 709/219

OTHER PUBLICATIONS

Paelke V et al: "Foot-based mobile interaction with games", ACM International Conference Proceeding Series—ACM SIGCHI International Conference on Advances in Computer Entertainment Technology, ACE 2004 2004 Association for Computing Machinery USA, vol. 74, 2004, pp. 321-324, XP002617728.

Kojima Y et al: "Hand manipulation of virtual objects in wearable augmented reality", Proceedings Seventh International Conference on Virtual Systems and Multimedia IEEE Comput. Soc. Los Alamitos, CA, USA, 2001, pp. 463-469, XP002617729.

Kato H et al: "Virtual object manipulation on a table-top AR environment", Augmented Reality, 2000. (ISAR 2000). Proceedings. IEEE and ACM International Symposium on Munich, Germany Oct. 5-6, 2000, Piscataway, NJ, USA,IEEE, US, Oct. 5, 2000, pp. 111-119, XP010520320. DOI: DOI:I0.1109/ISAR.2000.880934.

Cheok A 0 et al: "Combining the Real and Cyber worlds using Mixed Reality and Human Centered Media", 2005 International Conference on Cyberworlds IEEE Computer Society Los Alamitos, CA, USA Nov. 23, 2005, pp. 14-26, XP010889358.

European Communication for Application No. 10720947.0 dated Jan. 17, 2013.

British Examination Report for Application No. GB0907962.5 dated Aug. 13, 2013.

* cited by examiner

US 8,933,968 B2

ENTERTAINMENT DEVICE, SYSTEM, AND METHOD

CROSS REFERENCE TO RELATED APPLICATIONS

The present application is a national phase entry under 35 U.S.C. §371 of International Application No. PCT/GB2010/050720 filed Apr. 30, 2010, published in English, which claims the benefit of and priority to GB Patent Application No. 0907962.5, filed May 8, 2009, the entire disclosures of which are hereby incorporated by reference herein.

The present invention relates to an entertainment device, system and method.

Recently, with the advent of ever more powerful computers, video game systems are increasingly being used to combine real images captured by a video camera with virtual images so as to generate augmented reality images (composite images) and produce a content-rich gaming experience for a user.

For example, augmented reality systems are known in which a user can interact with a computer generated object (virtual object) by causing inter-image motion to occur in images captured by a video camera. A game function or game operation may then be activated in response to detected inter-image movement. Often, in order for the computer generated object to appear as if on a surface, a virtual plane is generated which may correspond to a real plane, such as the surface of a table, so that the computer generated object can be rendered as if on the table.

In a first aspect, there is provided an entertainment device for receiving images from a video camera, the device comprising: a combiner operable to combine images captured by the camera with a computer-generated image of an object resting on a virtual surface so as to generate a composite image; a detector operable to detect image movement in the captured images in one or more contact point regions corresponding to image positions at which the object contacts the virtual surface; and an initiator operable to initiate movement of the object to a new position with respect to the virtual surface in response to detected motion in the contact point regions of the captured images, in which: the detector is operable to detect whether a first image area corresponding to a captured image feature is greater than a predetermined proportion of a second image area corresponding to a full field of view of the camera; and in response to a detection that the first image area is greater than the predetermined proportion of the second image area, the initiator is operable to initiate movement of the object to an avoidance position within the composite image.

In a second aspect, there is provided an entertainment method comprising: receiving images from a video camera; combining a computer-generated image of an object resting on a virtual surface with images captured by the camera so as to generate a composite image; detecting image movement in the captured images in one or more contact point regions corresponding to image positions at which the object contacts the virtual surface; initiating movement of the object to a new position with respect to the virtual surface in response to detected motion in the contact point regions of the captured images; detecting whether a first image area corresponding to a captured image feature is greater than a predetermined proportion of a second image area corresponding to a full field of view of the camera; and initiating movement of the object to an avoidance position within the composite image in response to a detection that the first image area is greater than the predetermined proportion of the second image area.

Embodiments of the invention advantageously improve the illusion of reality of a computer generated object in a real environment by initiating movement of the object to a new position with respect to the virtual plane in response to detected motion in contact point regions of the captured images. In other words, embodiments of the present invention detect image motion so as to detect whether a real object is at or near an image position corresponding to the computer generated object.

For example, the contact point regions could correspond to where feet of a virtual pet contact the virtual plane. If, for example, a user moves their hand (or other object) to where the feet of the virtual pet contact the virtual plane, the illusion of reality is more easily maintained because the virtual pet can be caused to appear to move out of the way of the user's hand. Accordingly, the object can be caused to appear to avoid real objects by moving to a new position within the captured images in response to movement of real objects, such as a user's hand. This helps maintain the illusion that the computer generated object is in the real environment.

Further respective aspects and features of the invention are defined in the appended claims.

Embodiments of the present invention will now be described by way of example with reference to the accompanying drawings, in which.

An entertainment device, system and method are disclosed. In the following description, a number of specific details are presented in order to provide a thorough understanding of embodiments of the present invention. However, it will be apparent to a person skilled in the art that these specific details need not be employed to practise the present invention. Conversely, specific details known to the person skilled in the art are omitted for the purposes of clarity in presenting the embodiments.

Figure 1:
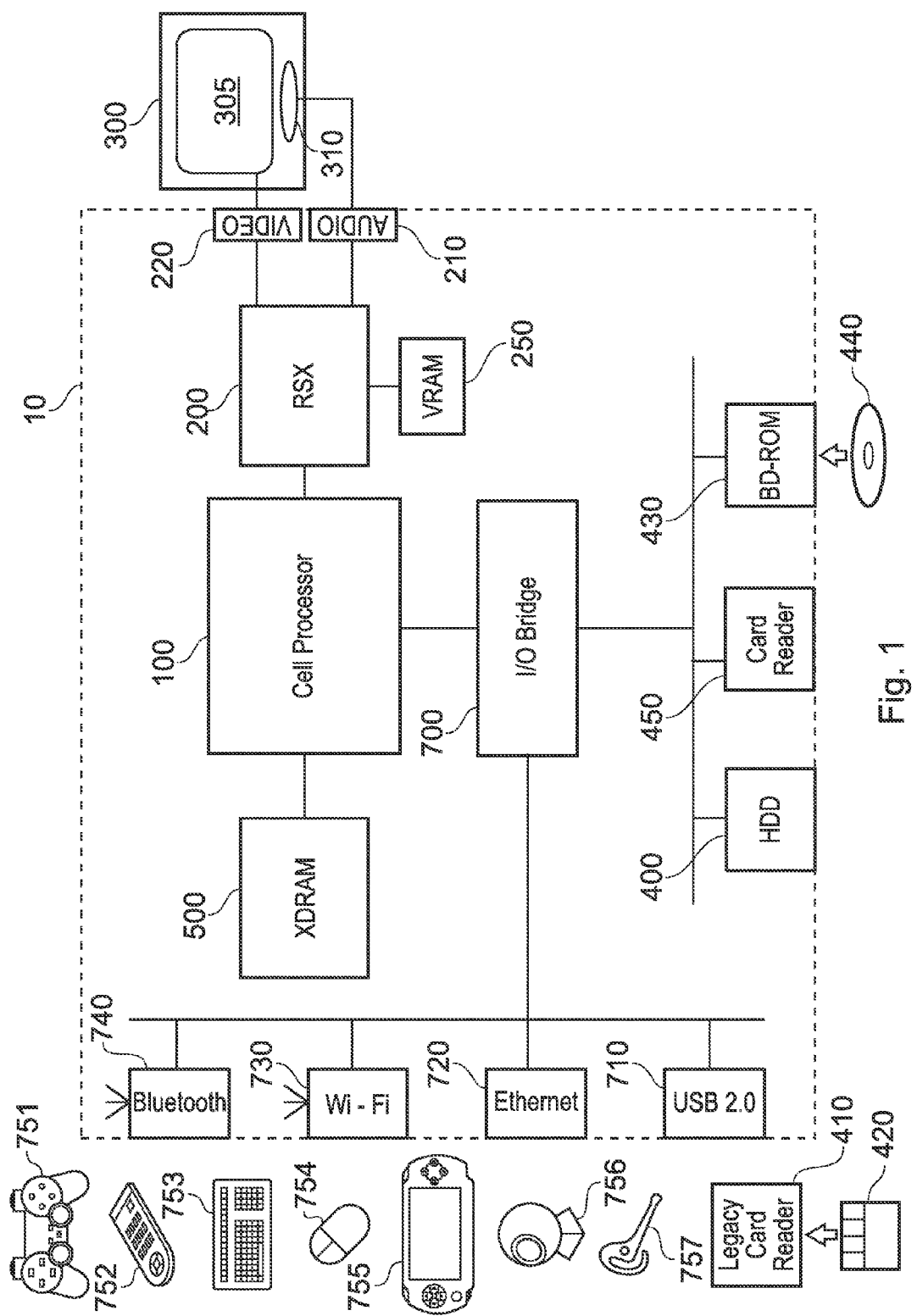
FIG. 1 is a schematic diagram of an entertainment device.

FIG. 1 schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Figure 2:
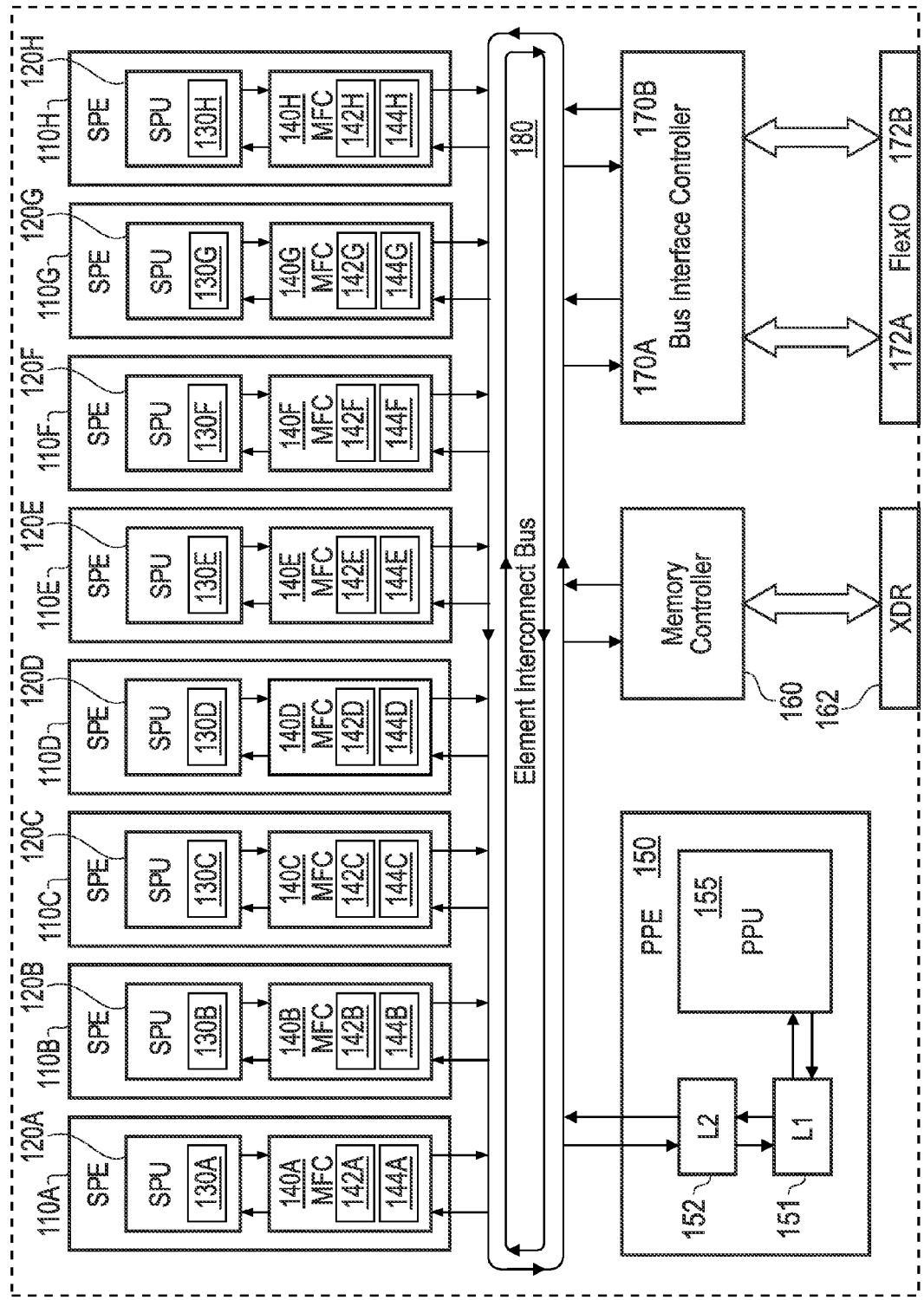
FIG. 2 is a schematic diagram of a cell processor.

Referring now to FIG. 2, the Cell processor 100 has an architecture comprising four basic components: external input and output structures comprising a memory controller 160 and a dual bus interface controller 170A,B; a main processor referred to as the Power Processing Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload. In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronise with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160.

The Element Interconnect Bus (EIB) 180 is a logically circular communication bus internal to the Cell processor 100 which connects the above processor elements, namely the PPE 150, the memory controller 160, the dual bus interface 170A,B and the 8 SPEs 110A-H, totaling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise dataflow between any two participants is six steps in the appropriate direction. The theoretical peak instantaneous EIB bandwidth for 12 slots is therefore 96B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B. The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Figure 3:
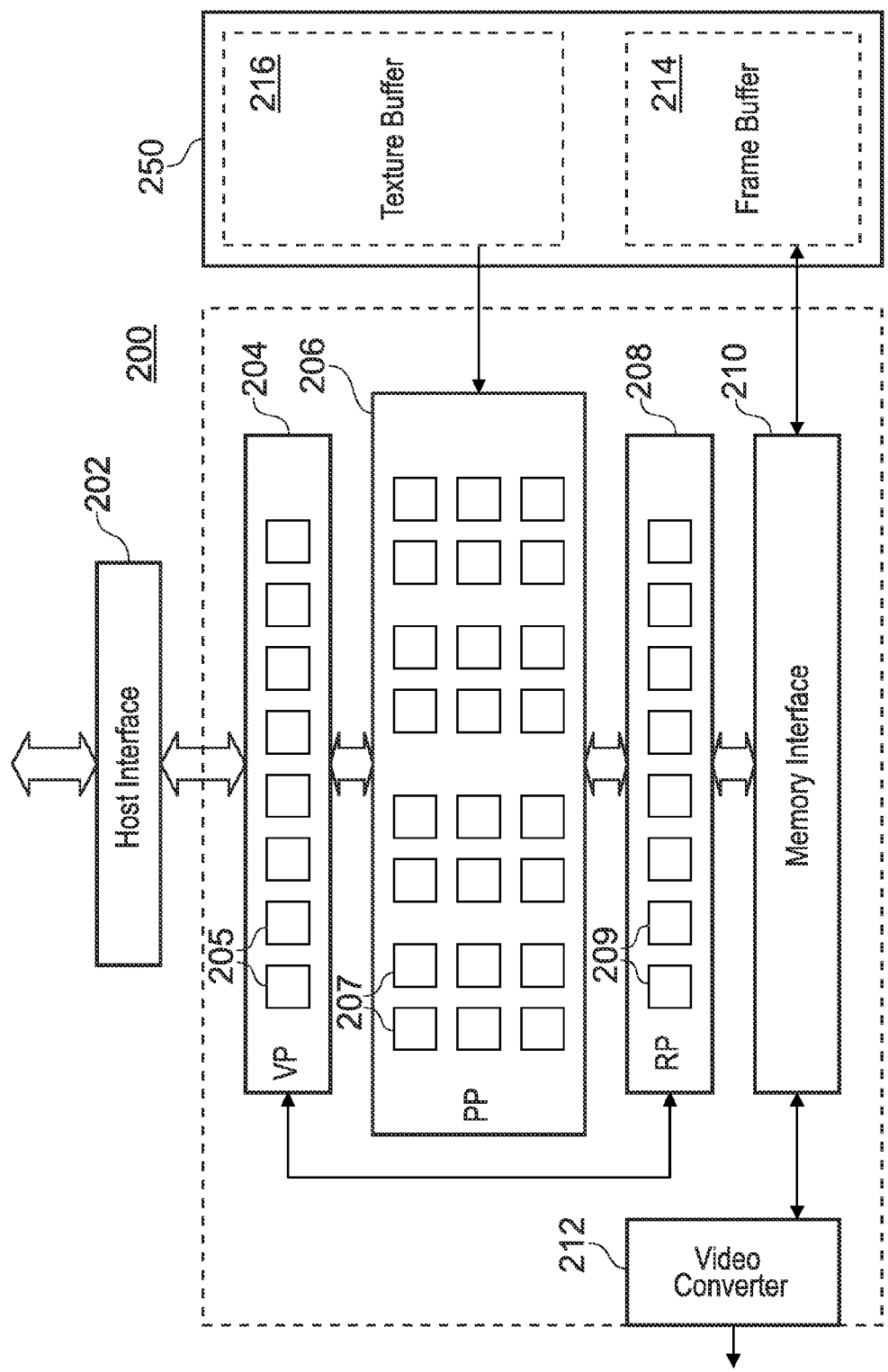
FIG. 3 is a schematic diagram of a video graphics processor.

Referring now to FIG. 3, the Reality Simulator graphics (RSX) unit 200 is a video accelerator based upon the NVidia® G70/71 architecture that processes and renders lists of commands produced by the Cell processor 100. The RSX unit 200 comprises a host interface 202 operable to communicate with the bus interface controller 170B of the Cell processor 100; a vertex pipeline 204 (VP) comprising eight vertex shaders 205; a pixel pipeline 206 (PP) comprising 24 pixel shaders 207; a render pipeline 208 (RP) comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of colour, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B. The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

Embodiments of the present invention in which an augmented reality marker is used to calibrate a real world space so that augmented reality images may be generated will now be described with reference to FIGS. 4 to 8.

Figure 4:
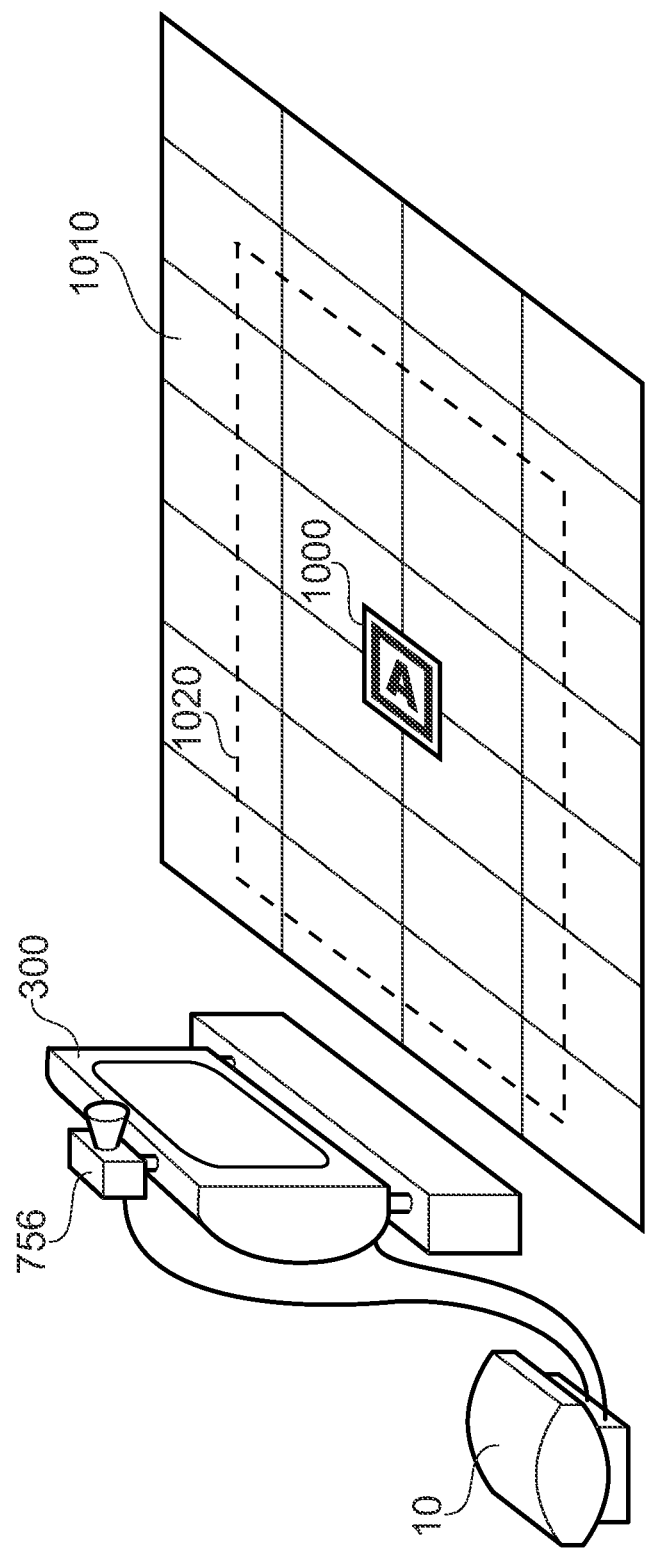
FIG. 4 is a schematic diagram of an arrangement of an entertainment system with respect to an augmented reality marker.

FIG. 4 shows a schematic diagram of an entertainment system arranged to detect an augmented reality marker so that a user may interact with a video game. In the embodiments described below, the entertainment system is the same as that described above with reference to FIGS. 1 to 3. However, it will be appreciated that any suitable entertainment system could be used.

In particular, FIG. 4 shows the entertainment device 10, which is operably connected to the video camera 756 and the display and sound output device 300. Other elements of the entertainment system such as the game controller 751 have been omitted from FIG. 4 for the sake of clarity in understanding the drawing. In embodiments of the present invention, the video camera 756 is arranged to capture images of an augmented reality marker 1000. The detection of the augmented reality marker 1000 may then be used to generate a virtual image plane 1010 which relates to a real surface upon which the augmented reality marker 1000 is placed. The cell processor 100 can then generate an interaction area 1020 (indicated by the dashed line in FIG. 4). The interaction area is an area of the captured images within which virtual images may be generated and combined with the captured video images so that a user may interact with the virtual images. The interaction area will be described in more detail later below.

In embodiments of the present invention, the interaction area 1020 allows a user to interact with, for example, a virtual pet, which may be displayed combined with images of the real environment. For example, the virtual pet may displayed such that it appears to walk or run around on the virtual image plane 1010 within the interaction area 1020. This provides a user with images which make it appear as if the virtual pet is actually on the surface upon which the augmented reality marker 100 was placed.

The way in which this functionality is achieved is described below.

In order for a virtual reality object, such as a virtual pet, to be combined with real images in such a way as to be believable to a user, the position of the video camera 756 and the images captured by the video camera 756 is preferably calibrated in such a way as to allow virtual images to be rendered so that they correspond to a real surface in, for example, a user's living room. Once this has been done, the virtual pet may be rendered in such a way as to make it appear to move around on that surface. For example, the camera can be calibrated so that the virtual image plane 1010 corresponds to a tabletop in the user's living room. The virtual pet can then be rendered such that it appears to run around on the tabletop, giving the illusion to the user that the pet is in the user's room.

In other embodiments, the virtual image plane 1010 need not correspond to a real surface, for example if the virtual pet is to be rendered in such a way as to appear to be flying.

Accordingly, embodiments of the invention allow the virtual image plane 1010 to be calibrated from the position of the augmented reality marker 1000 on a real surface (such as the tabletop). To achieve this, the user places the augmented reality marker 1000 on a suitable surface so that the augmented reality marker 1000 is within a field of view of the video camera 756. The cell processor 100 then generates the virtual image plane 1010 accordingly.

In some embodiments, this calibration process may be carried out at the start of a game, for example by a user placing the augmented reality marker 1000 on a surface to be calibrated in response to an on-screen prompt generated by the cell processor 100. In other embodiments, the calibration may be carried out in response to a user selection via a suitable user interface (for example a game controller 751) indicating that calibration of the virtual image plane 1010 should be carried out. However, it will be appreciated that the calibration could be carried out at any suitable point in the game.

The way in which the virtual image plane is generated will now be described.

Figure 5:
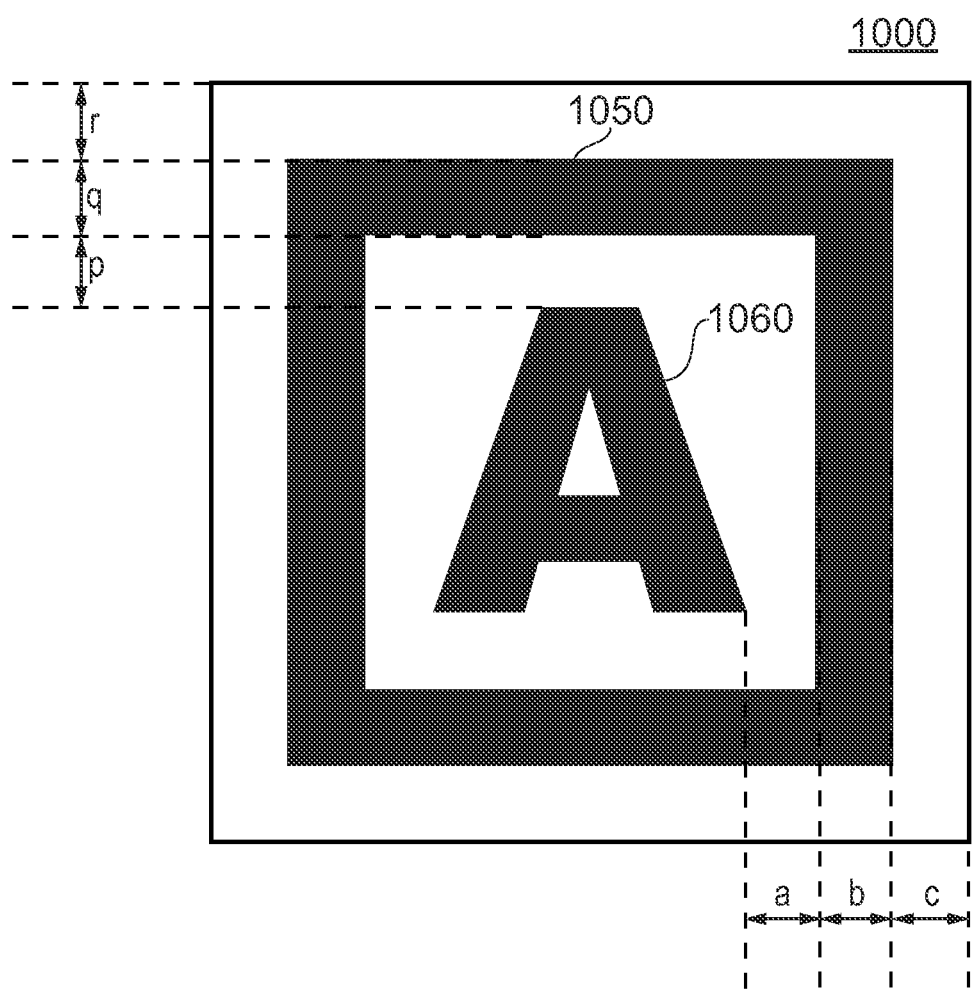
FIG. 5 is a schematic diagram of an example of an augmented reality marker in accordance with an embodiment of the present invention.

FIG. 5 shows an example of an augmented reality marker 1000 which may be used to calibrate the virtual image plane 1010 in accordance with embodiments of the present invention.

The augmented reality marker 1000 comprises an image of a square 1050 together with an alphanumeric character such as the letter "A" 1060, although it will be appreciated that other suitable symbols or patterns could be used. The augmented reality marker 1000 shown in FIG. 5 is two-dimensional although it will be appreciated that such markers may be applied to a three dimensional object as shown for example in FIG. 7.

During calibration, the cell processor 100 detects the augmented reality marker 1000 by analysing the images captured by the video camera 756. The cell processor 100 applies an image threshold to the captured images so as to generate a binary black and white image. The cell processor 100 then detects pixel regions which are likely to correspond to the square 1050 (also referred to as a "quad"), using known techniques such as edge following and template matching. Those regions of an analysed image which are detected by the cell processor 100 as comprising quads are then analysed using known techniques to detect whether there is an alphanumeric character e.g. the letter A 1060 within the square 1050.

The cell processor 100 then calculates a probability associated with each image region that is detected as comprising an alpha numeric character within a quad. The cell processor then detects which image region has the highest probability and labels that region as corresponding to the augmented reality marker 1000. The position of the augmented reality marker 1000 may then be used as a reference point about which the virtual image plane 1010 and the interaction area 1020 may be defined.

In the example augmented reality marker shown in FIG. 5, a distance (denoted "a" in FIG. 5) between the alphanumeric character A 1060 and the inside of the quad 1050 is substantially the same as that of a thickness (denoted "b" in FIG. 5) of the quad 1050 and a distance (denoted "c" in FIG. 5) between the outside of the quad 105 and an outside edge of the marker 1000. Additionally, a distance (denoted "p" in FIG. 5) between the alphanumeric character A 1060 and the inside of the quad 1050 is substantially the same as that of a thickness (denoted "q" in FIG. 5) of the quad 1050 and a distance (denoted "r" in FIG. 5) between the outside of the quad 105 and an outside edge of the marker 1000. In other words, in an embodiment, a=b=c=p=q=r. This assists the cell processor 100 in detecting the marker because the marker 1000 can be split up into a grid of 5 by 5 sub regions which may be individually analysed by the cell processor 100 so as to help detect a quad together with an alphanumeric character, other symbol or pattern.

However, in most arrangements, such as the one shown in FIG. 4, the optical axis of the video camera 756 will not be perpendicular to a surface upon which the augmented reality marker 1000 is placed. Accordingly, the captured image of the augmented reality marker 1000 is likely to be distorted. To address this, when detection of quads is carried out by the cell processor 100, the cell processor 100 is also operable to detect rotational, skew and trapezoidal transforms of the augmented reality marker 1000 using known techniques.

Once the augmented reality marker 1000 has been detected, the distortion of the image of the augmented reality marker 1000 may then be advantageously analysed to detect the surface (for example, a tabletop) upon which the augmented reality marker 1000 is placed. Assuming that the surface upon which the augmented reality marker 1000 is placed is a substantially planar surface and that the marker is arranged to be substantially co-planar with the surface, then the virtual image plane 1010 may be generated accordingly by mapping the detected distortion of the marker 1000 to the surface.

In an embodiment, a representation of the augmented reality marker 1000, including for example the shape and size of the marker 1000, is preloaded into the XDRAM 500 from a suitable recording medium such as a Blu-ray® disc 440 or from the HDD 400. In an embodiment, the cell processor 100 is operable to calculate a transform which corresponds to transforming the marker 1000 so that it is a predetermined distance away from the video camera 756 and perpendicular to the optical axis of the camera. As the marker 1000 is parallel (arranged to be substantially co-planar) to the surface upon which it is placed (at least in those circumstances where the surface is substantially planar), the resultant calculated transform may be used to calculate coordinates which define the virtual image plane 1010. However, it will be appreciated that other suitable methods for generating the virtual image plane 1010 from the detection of the marker could be used.

In another embodiment, if the dimensions of the augmented reality marker 1000 are not previously known, a calibration of the shape and size of the marker 1000 may be carried out by the system unit 10 in response to a user selection from a suitable menu displayed on the display and sound output device 300.

During this calibration, the user holds the augmented reality marker 1000 within the field of view of the video camera 756 so that the augmented reality marker 1000 is normal to the optical access of the video camera 756 and is a predetermined distance away from the video camera 756. The cell processor 100 then detects the dimensions of the augmented reality marker 1000 from the size of the captured image with respect to a full-pixel resolution of the camera using known techniques and stores the resultant image to memory so that the marker can be detected. Accordingly, the dimensions and the stored image form a predetermined representation of the marker which may be used to detect the augmented reality marker within the captured images and detect a degree of distortion between the detected marker and the predetermined representation so as to generate the virtual image plane 1010.

As well as, or instead of, detecting the dimensions of the marker and storing an image of the marker, an augmented reality marker mask may be generated by applying a binary threshold to the captured image an edge detection. The resultant mask may then form the representation of the marker which is used to detect the marker and calculate the degree of distortion between the marker and the predetermined representation. However, it will be appreciated that any other suitable method of generating the predetermined representation of the augmented reality marker may be used.

In an embodiment, only one image frame is used to calibrate the virtual image plane as described above. This may be performed in response to a selection by the user that calibration of the image plane 1010 is to be carried out. Alternatively, the calibration of the virtual image plane 1020 to the actual surface upon which the marker 1000 is placed may be performed automatically on loading a game. In other embodiments, the virtual image plane 1020 is calibrated by calculating the mean average of coordinates relating to virtual image planes each generated from respective images within a sequence of video images. In some embodiments, a user may place the augmented reality marker within an area of the field of view of the camera 756 as indicated by the system 10 on the display 305 so that calibration of the virtual image plane may be carried out as described above. However, it will be appreciated that the virtual image plane may be calibrated at any other suitable point in the game, in response to an indication by the system 10 that calibration is to be carried out or in response to any other suitable user input.

Once calibration of the virtual image plane has been carried out, a user can then remove the virtual reality marker 1000 from the field of view of the video camera 756. By using an augmented reality marker to calibrate a virtual image plane, calibration of the plane may be carried out quickly and efficiently so that the virtual image plane can be used during generation of augmented reality images.

In embodiments of the present invention, a virtual pet may be generated by the system unit 10 so that the pet can be displayed on the display and sound output device 300 and appear combined with the real images.

In one embodiment, the virtual image plane 1010 may be generated by the cell processor 100 so that the virtual image plane 1010 extends throughout the field of view of the video camera 756. However, if the pet is caused to move around in the virtual image plane 1010, either in response to user input or in response to instructions generated by the cell processor 100, other real objects within the images captured by the video camera 756 may overlap with a generated position of the virtual pet, thereby detrimentally affecting the illusion of a virtual pet in a real environment.

For example, this may occur where the planar surface upon which the augmented reality marker 1000 has been placed is a floor of a user's living room. In this situation, there may be furniture around the edge of the room which is also within the field of view of the video camera 756 which might affect the generation of the augmented reality images. To address this problem, the cell processor 100 is operable to generate an interaction area which is a region of the captured images in which the virtual reality object may be displayed for interaction with the user. The interaction area 1020 is shown as the dashed line in FIG. 4. In embodiments of the present invention, movements of the virtual pet are restricted so that the pet can only move within the virtual interaction area 1020. Accordingly, movement of the virtual pet is less likely to cause the virtual pet to be displayed in an area of the screen 305 which corresponds to other real world objects.

The user may interact with the virtual pet via any suitable user interface such as the game controller 751. Preferably, the user interacts with the virtual pet via motion, images of which are captured by the video camera 756. The cell processor 100 analyses the captured images for motion occurring near the pet using known techniques, and modifies and controls the behaviour of the virtual pet accordingly. A user can also interact with other virtual objects generated by the cell processor 100 in a similar way.

In embodiments of the present invention, the interaction area 1020 is automatically set by the cell processor 100 to be centred on the detected augmented reality marker 1000 and to be 50 percent of the full pixel area of the images captured by the video camera 756. In other embodiments, the interaction area 1020 is set by the cell processor 100 to correspond to 50 percent of the full pixel area of the images captured by the video camera 756 and to be a lower half of the full pixel area. However, it will be appreciated that any other suitable proportion of the pixel area or location of the selected area with respect to the marker 1000 may be used.

Additionally, a user may select the shape of the interaction area 1020 by using a suitable user interface and an on screen selection menu generated by the cell processor 100. For example, as shown in FIG. 4, the interaction area 1020 could be rectangular with the centre of the rectangle corresponding to the position of the augmented reality marker 1000 which was used to calibrate the virtual image plane. In some embodiments, the shape of the interaction area 1020 is substantially trapezoidal in the virtual image plane 1010 so that when the virtual image plane 1010 is mapped to a plane parallel to an image plane of the camera 756, the interaction area 1020 appears to be rectangular. However, it will be appreciated that other shapes of interaction area may be used and that the interaction area need not be centred on the virtual reality marker 1000.

Alternatively, the interaction area is generated by the cell processor 100 so that the interaction area corresponds to detected interaction area pixels. Interaction area pixels are those which surround the detected augmented reality marker 1000 and are colour matched to within a predetermined colour threshold with respect to a detected colour of one or more pixels adjacent to pixels which correspond to the augmented reality marker 1000. The cell processor 100 detects the interaction area pixels by detecting an average colour of pixels which are adjacent to those corresponding to the augmented reality marker 1000. The cell processor 100 then detects which pixels are contiguous with the pixels adjacent to the augmented reality marker 1000 and are within a predetermined colour threshold of the pixels adjacent to the augmented reality marker 1000 so as to generate the interaction area pixels.

However, a problem may occur if there are some pixels surrounding the augmented reality marker 100 which are a different colour or luminance to a majority of the pixels surrounding the marker 1000 but which should nevertheless be included in the interaction area. For example, this may occur if there is a dark spot on a carpet on which the marker 1000 is placed. In this case, the dark spot would be excluded from the interaction area, thus preventing the virtual pet from entering that area. Therefore, in an embodiment, the cell processor is operable to apply known pixel smoothing and/or filtering techniques as appropriate to pixels surrounding the augmented reality marker 1000 before carrying out the detection of the interaction area pixels. This reduces the likelihood that any small image features surrounding the marker 1000 and occurring on a surface upon which the augmented reality marker 1000 is placed are incorrectly excluded from the interaction area.

In one embodiment, the cell processor is operable to limit the generation of interaction area pixels so that they only occur within, for example, 50 percent of the full pixel area of the images captured by the video camera 756 centred on the marker 1000 as described above. However, it will be appreciated that any other suitable proportion of the pixel area or location of the selected area with respect to the marker 1000 may be used.

An embodiment in which two augmented reality markers are used to define the interaction area 1020 will now be described with reference to FIG. 6.

Figure 6:
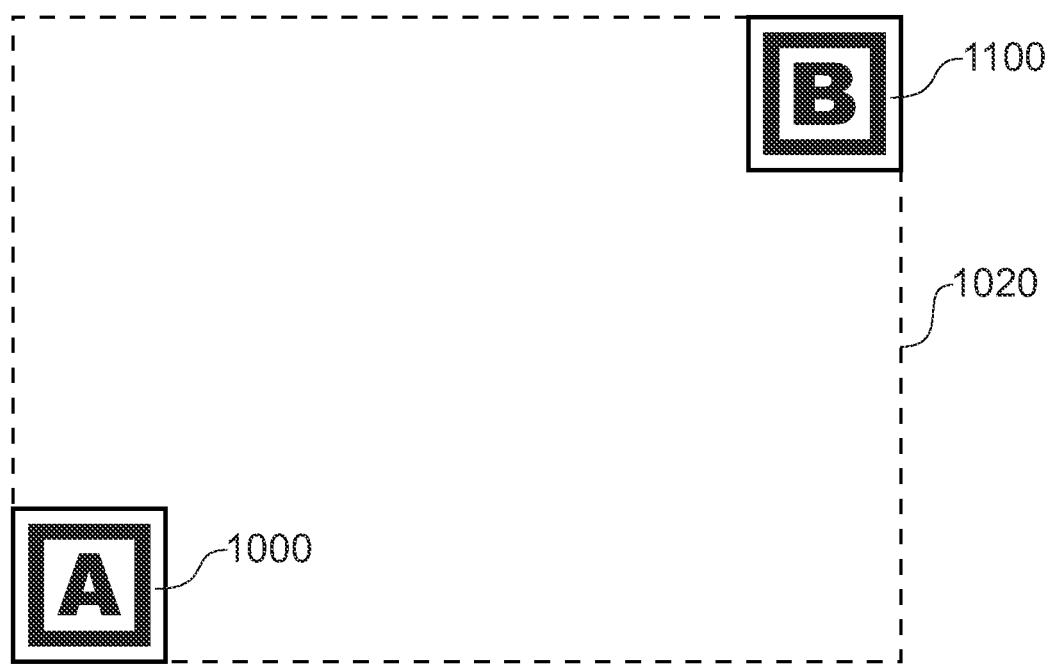
FIG. 6 is a schematic diagram of a three-dimensional augmented reality marker.

FIG. 6 shows augmented reality marker 1000 together with another augmented reality marker 1100. In this embodiment, the cell processor 100 is operable to detect the augmented reality marker A 1000 and the augmented reality marker B 1100 and generate the interaction area so that at least part of a perimeter of the interaction area 1020 corresponds with the detected augmented reality markers 1000 and 1100. For example, the augmented reality markers 1000 and 1100 may indicate the corners of a rectangle as shown in FIG. 6. In this way, a user may position the augmented reality markers 1000 and 1100 so that they delineate the corners of the interaction area within a physical space such as the floor of a living room. Additionally, the cell processor 100 can detect the relative size and any image distortion of the two markers using known techniques so as to map the virtual image plane 1010 (not shown in FIG. 6) to the surface upon which the markers are placed.

It will be appreciated that the augmented reality markers 1000 and 1100 may be used to indicate the perimeter an interaction area having a shape which is different from that of the interaction area 1020 shown in FIG. 6. Accordingly, it will be appreciated that the shape of the interaction area 1020 need not be limited to a rectangle and that other shapes such as a square, a circle and a triangle and the like may be used.

Additionally, any number of augmented reality markers may be used to indicate the perimeter of the interaction area 1020. However, an increase in the number of augmented reality markers may increase the amount of processing resources needed to detect the markers and therefore generate the interaction area. Additionally, an interaction area defined in this way may sometimes cause "invisible walls" to be generated such that the virtual pet can not go outside the interaction area (i.e. they are stopped by an invisible wall). This can sometimes adversely affect the illusion of the virtual pet in the real environment because a user cannot see the edge of the interaction area. However, such a system for defining the interaction area may be useful if there are many real objects in the real environment which should not be part of the interaction area.

An embodiment in which a three dimensional augmented reality marker may be used will now be described with reference to FIG. 7.

Figure 7:
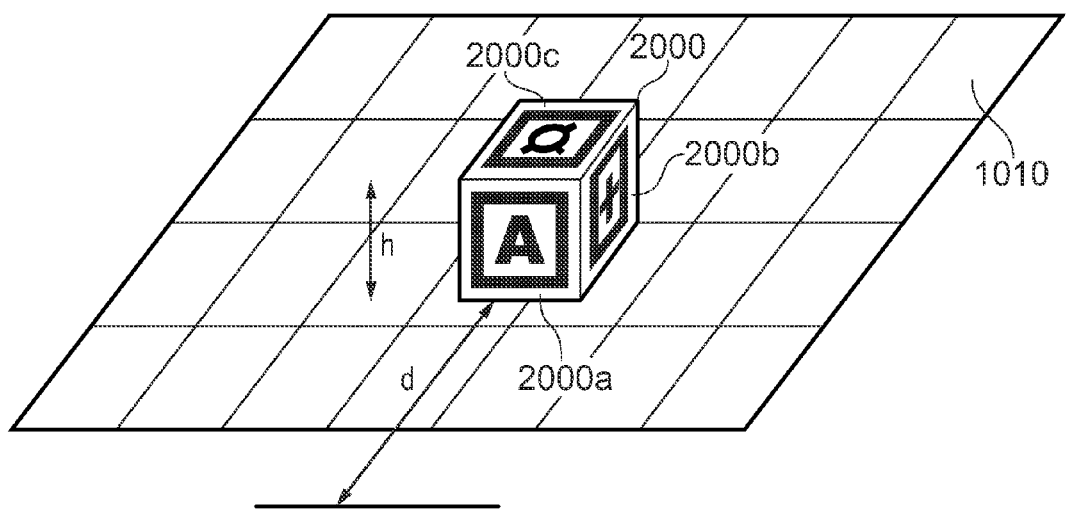
FIG. 7 is a schematic diagram of an interaction area and two augmented reality markers.

FIG. 7 shows a three dimensional augmented reality marker 2000 which may be used to generate the virtual image plane 1010 and/or the interaction area 1020. In the embodiment shown in FIG. 7, the three dimensional virtual reality marker 2000 is a cube comprising a plurality of marker faces 2000a, 2000b and 2000c, each of which comprises a quad in which there is a shape indicating the relative orientation of that marker face. For example, the marker face 2000a comprises a quad in which an alphanumeric character "A" is shown. The marker faces 2000b and 2000c show two different non-alphanumeric characters. However, it will be appreciated that other three dimensional shapes may be used for the virtual augmented reality marker 2000 and that the images on the marker need not be planar in nature.

The use of a three-dimensional augmented reality marker addresses a problem which may occur if the optical axis of the camera forms an acute angle with a line parallel to the surface upon which the augmented reality marker is placed. In this case, distortions of a two dimensional marker placed on the surface may be so great as to mean that detection by the cell processor 100 of the augmented reality marker 1000 becomes unlikely or impossible. Even if detection of the marker is possible, it may not be possible to detect the distortion with sufficient accuracy to use the marker to calibrate the virtual image plane.

However, by using a three dimensional augmented reality marker such as the augmented reality marker 2000, at least part of the marker is likely to be substantially perpendicular to the optical axis of the video camera 756. This advantageously increases the likelihood that the marker will be detected. In the example shown in FIG. 7, the cell processor 100 is likely to detect the marker face 2000a and assign that region of the image as corresponding to the marker 2000. Given a height h of the augmented reality marker 2000 (which may be predetermined within software, loaded from a suitable storage medium, input by a user and the like), the cell processor 100 can then detect the distortion of marker faces 2000b and 2000c so as to generate the virtual image plane 1010. The virtual image plane and the interaction area 1020 are generated as described above with reference to FIGS. 4 to 6.

In some embodiments, the video camera 756 is operable to generate depth information which relates to a distance between the video camera 756 and objects within the field of view of the video camera 756. Such cameras are generally termed "Z-Cameras" because they measure the "z" coordinate and are known in the art (see, for example, http://www.3dvsystems.com/technology/tech.html, which relates to the Z-Cam manufactured by 3DVsystems). Various different techniques such as time-of-flight and infra-red pattern distortion are known for generating depth information, so these techniques will not be described in detail here.

In one embodiment, the depth information for each pixel is generated by the video camera. Alternatively, the depth information for each pixel may be generated by the cell processor 100 by analysing the data received from the camera. In this way, a distance d (as shown in FIG. 7) to the augmented reality marker 2000 can be detected. The cell processor 100 then generates the virtual image plane 1010 within the captured video images such that the virtual image plane is defined with respect to the detected three dimensional spatial position of the augmented reality marker 2000 as described above.

The use of a camera which is operable to generate depth information may also be used to detect advantageously objects which are greater than a predetermined distance above the virtual image plane. In an embodiment, objects which are detected as being greater than a predetermined distance above the virtual image plane are excluded from the interaction area. This prevents objects which may overhang the interaction area or which obscure the interaction area such as a tabletop from being included in the interaction area.

Furthermore, the use of a z-camera can, for example, allow the cell processor 100 to generate the virtual pet such that the pet can appear to run around the back of an object (i.e. be temporarily obscured from the view of the camera). In other words, the Z-camera can be used to detect an occlusion of a virtual object (e.g. the virtual pet) by a real object in the real environment. To achieve this, the cell processor is operable to detect, by analysing the depth information, whether a virtual reality object position (e.g. the position of the virtual pet) is such that the virtual reality object is occluded from a point of view of the video camera by a real object. If the virtual reality object is detected to be occluded by the real object, the cell processor 100 can then generate the virtual object so that the virtual object appears to be behind the real object. This improves an illusion to a user that the virtual pet is actually in the real environment.

In embodiments of the invention, a user may interact with, for example, the virtual pet, by moving their hand near the virtual pet. To achieve this functionality, in some embodiments the cell processor 100 causes an image in which there are no moving objects (for example when calibrating the virtual image plane using the augmented reality marker 1000 or the augmented reality marker 2000) to be stored to the XDRAM 500 of the HDD 400 and assign this image as a background image. Subsequent image frames are then analysed by the cell processor 100 to detect changes in pixel values with respect to the background image. Any pixel values which change with respect to the background image are labelled as foreground pixels and are likely to correspond to motion by, for example, a user. This technique is known as background subtraction. The cell processor 100 then carries out known object detection and tracking techniques to assign an object type to respective foreground pixels. In an embodiment, each interaction object may interact with the virtual pet in a different way.

For example, a rapid change in pixel value above the pet, but in close proximity to the pet, may correspond to a user mimicking a tickling motion and therefore the cell processor 100 can render the pet so that it reacts accordingly. However, it will be appreciated that any other forms of interaction may be used and that other virtual reality objects such as footballs, vehicles, tools and the like could be simulated.

However, the use of background subtraction to detect motion can give rise to false detection of motion and can be very sensitive to ambient lighting conditions; any change with respect to the background image as originally stored will be detected as motion. Therefore, in preferred embodiments, the cell processor 100 is operable to detect image-to-image differences by subtracting a current image from an adjacent preceding image. Those pixels in the current image which are detected as having changed, or as having changed by at least a threshold amount, with respect to corresponding pixels in the previous image are flagged as corresponding to image movement (also referred to as inter-image motion). Real objects such as a user's hand may then be detected and tracked using known techniques such as optical flow.

Additionally, the augmented reality marker 1000 or the augmented reality marker 2000 may be used as a game feature within a game executed by the entertainment device 10. For example, where the game allows interaction with a virtual pet, the augmented reality marker could be used to simulate a pet feeding device such as a water bottle or the marker may be used to indicate where simulation of cleaning the pet (for example, giving the pet a bath) should be carried out. As another example, the augmented reality marker could correspond to a food container which can be filled from a virtual food dispensing device with virtual food for the pet. The user may then manipulate the augmented reality marker so as to cause the virtual food in the container to be dispensed into a virtual food bowl generated by the cell processor 100. However, it will be appreciated that the augmented reality marker could act as any suitable object or indicator appropriate to a game with which it is associated.

In some embodiments, the cell processor 100 is operable to cause the reality simulator graphics unit RSX 200 to render a virtual hole in the virtual image plane 1010. In other words, it will appear to a user as if there is a hole in, for example, the floor of their room. The cell processor 100 can then cause virtual objects and/or the virtual pet to appear and disappear (also referred to respectively as spawning an object and removing an object from the augmented reality environment) through the virtual hole as, and when, a virtual object and/or a virtual pet are generated or removed from the virtual environment. The cell processor 100 can then cause the virtual hole to disappear once an object or the pet has been generated (spawned) or removed from the augmented reality environment. A method of generating a virtual image plane will now be described with reference to FIG. 8.

Figure 8:
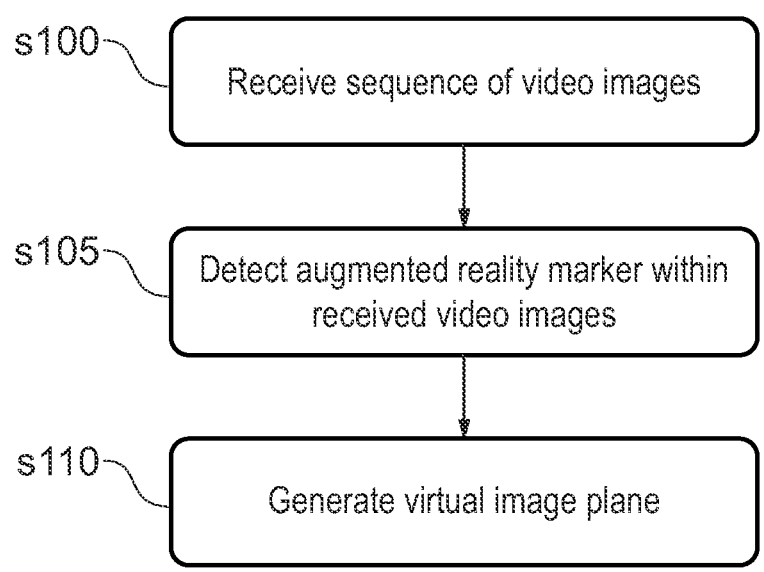
FIG. 8 is a flow chart showing a method of generating a virtual image plane.

FIG. 8 is a flow chart showing a method of generating a virtual image plane in accordance with embodiments of the present invention. As a first step s100, a sequence of video images captured by the video camera 756 is received by the entertainment device 10 via a communications link such as WIFI or Bluetooth®. Then, at a step s105, the cell processor 100 detects the augmented reality marker within the received video images as described above. Once an augmented reality marker has been detected at the step s105, the cell processor 100 is operable to generate, at a step s110, the virtual image plane such that the virtual image plane is defined within the captured video images, and the virtual video image plane is defined with respect to the detected augmented reality marker as described above. In other words, the cell processor 100 may generate the virtual image plane so that the virtual image plane corresponds with a surface (i.e. arranged to be substantially co-planar with the surface) upon which the augmented reality marker is placed.

It will be appreciated that the above described techniques may be combined as appropriate. For example, where more than one marker is used to define the virtual image plane and or the interaction area, one marker could be a three dimensional marker as described above with reference to FIG. 7, whilst other markers could be two dimensional.

As mentioned above, the cell processor 100 is operable to generate a virtual pet such that a user can interact with the virtual pet. For example, if the cell processor 100 detects image movement near the virtual pet, the cell processor 100 can cause the virtual pet to run away from a region on the virtual plane which corresponds to a region of detected movement.

However, there is a possibility that a real object, such as the user's hand, may sometimes be at an image position which corresponds to the image position of the virtual pet due to the user causing image movement near the virtual pet, for example by moving their hand. This can impair the illusion that the virtual pet is on the virtual surface, and therefore in the user's room, because it can often be unclear whether the virtual pet should be rendered so as to appear in front of, or behind, the user's hand.

One method of addressing this problem would be to detect the direction of the image movement, such as downward movement. Each direction of movement can be associated with an overlay parameter, stored in a look-up table, which indicates how the virtual pet should be rendered with respect to the captured images. For example, a detection of downward motion with respect to the captured images could indicate that the virtual pet should be rendered in front of pixels of the captured image which correspond to the detected motion, whereas upward motion could indicate that the virtual pet should be rendered so as to appear as if behind pixels of the captured image which correspond to the detected motion.

However, this can be computationally intensive because, in order for the an image region corresponding to a user's hand to be correctly rendered so as to appear as if in front of the virtual pet, the cell processor 100 has carry out object detection and create a mask for that image region. If the edges of the object are incorrectly identified, or if not all of the image region corresponding to the object is correctly detected, then there is a possibility that the virtual pet will show though "holes" in the object, or that the edges of the object as detected will not correspond to the edges of the object as perceived by the user in the captured images. This can impair the illusion that the virtual pet is present in the user's room.

Therefore, in embodiments of the present invention the cell processor is operable to detect image movement in the captured images in one or more contact point regions corresponding to image positions at which the object contacts the virtual plane, and initiate movement of the object to a new position with respect to the virtual plane in response to detected motion in the contact point regions of the captured images. Accordingly, the object can be cause to "avoid" image regions in which there is detected motion, and hence avoid image regions which are likely to correspond to a user's hand and the like. In other words, the object can be caused to appear to move out of the way of detected motion, thus more easily maintaining the illusion that the virtual object is in the real environment. This will be described in more detail below with reference to FIGS. 9 to 13.

Figure 9:
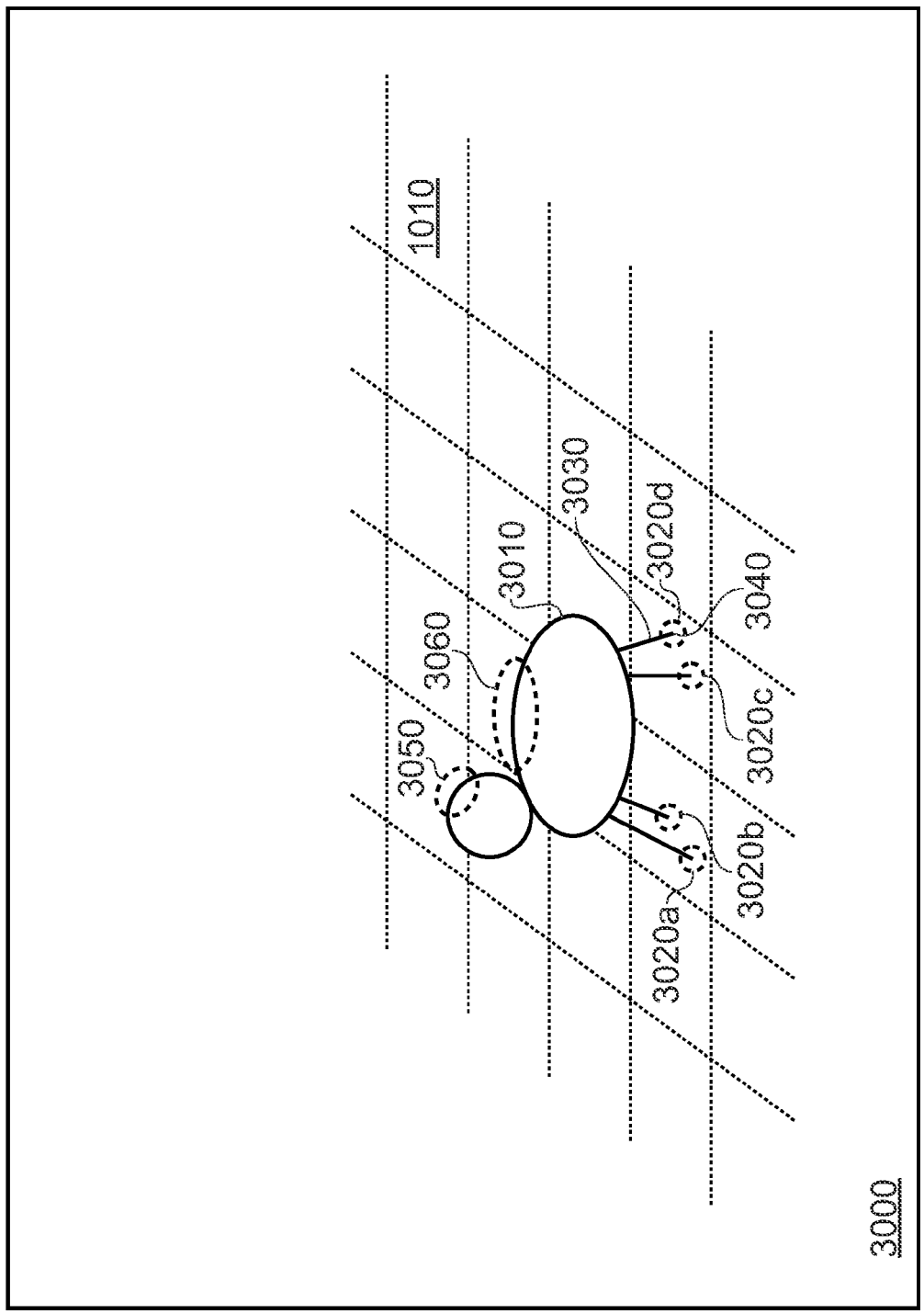
FIG. 9 is a schematic diagram of a composite image showing an object resting on a virtual plane in accordance with embodiments of the present invention.

FIG. 9 is a schematic diagram of a composite image showing an object resting on a virtual plane in accordance with embodiments of the present invention In particular, FIG. 9 shows a composite image 3000 which is generated by the cell processor 100 by combining, with images captured by the camera 756, a computer generated image of the virtual pet 3010 resting on the virtual plane 1010. In the example shown in FIG. 9, the virtual pet 3010 is in contact with the virtual plane at contact point regions 3020*a*, 3020*b*, 3020*c*, and 3020*d*. In this orientation of the virtual pet 3010, the contact point regions correspond to soles of the pet's feet. If a different sort of object (such as a wheeled toy) were used, the contact point regions would represent the position at which the object's wheels rest on the virtual plane.

The virtual pet also comprises at least part of a first interaction region 3050 and at least part of a second interaction region 3060. Although the virtual pet 3010 is shown as comprising 2 interaction regions, it will be appreciated that the virtual pet 3010 could comprise any number of interaction regions. The interaction regions will be described in more detail later below.

In some embodiments, one or more of the contact point regions correspond to only those image regions at which the virtual pet 3010 is in contact with the virtual plane 1010. An example of this is where the end of a leg 3030 of the virtual pet 3010 is in contact with the virtual image plane 1010 at a contact point region 3040, as shown in FIG. 9.

In other embodiments, one or more of the contact point regions includes a region of the virtual image plane surrounding the image positions at which the object contacts the virtual plane. Examples of this are contact point regions 3020*a*, 3020*b*, 3020*c*, and 3020*d*.

By arranging the contact point regions so that they include a region of the virtual image plane which surrounds the image positions corresponding to positions at which the object contacts the virtual plane, the likelihood that the augmented reality illusion will be impaired by incorrectly superposing the object over image features corresponding to movement or by superposing image features corresponding to movement over the object is reduced; the cell processor 100 is more likely to initiate movement of the object to a new position before image regions comprising image movement get too close to the object to impair the augmented reality illusion because the contact point regions 3020*a*, 3020*b*, 3020*c*, and 3020*d* are larger than the contact point region 3040. In some embodiments, the cell processor 100 is operable to generate the new position such that it lies at a random position on the virtual plane.

In other words, if for example, a user moves their hand (or other object) to where the feet of the virtual pet 3010 contact the virtual plane 1010, the illusion of reality is more easily maintained because the cell processor 100 can cause the virtual pet 3010 to appear to move out of the way of the user's hand.

Figure 10:
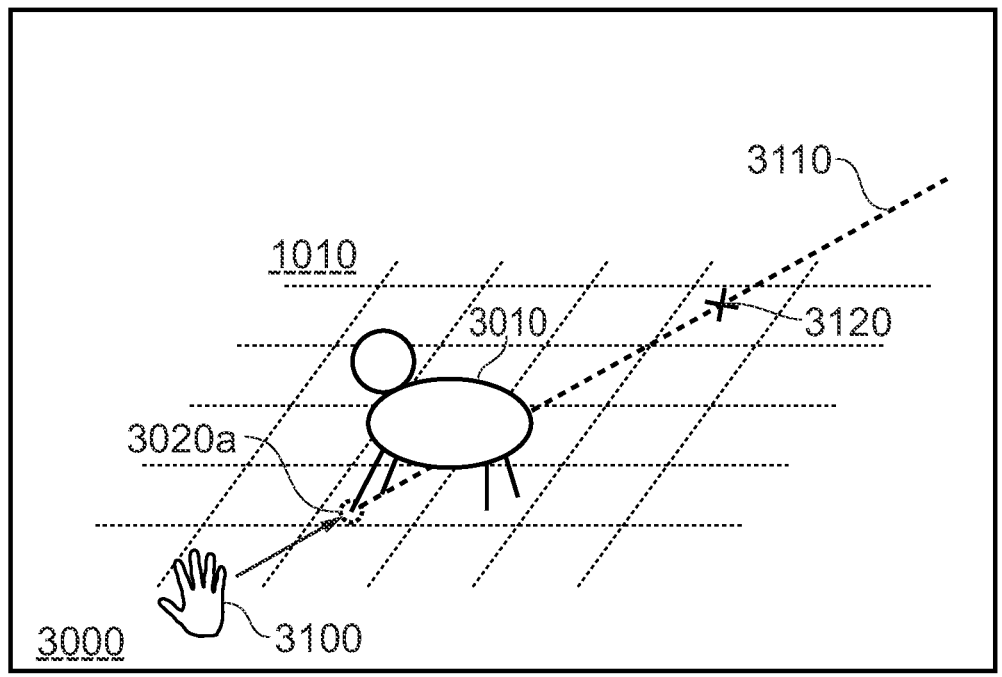
FIG. 10 is a schematic diagram of a composite image in which an object is caused to move to a new position in response to detected movement in accordance with embodiments of the present invention.
Figure 11:
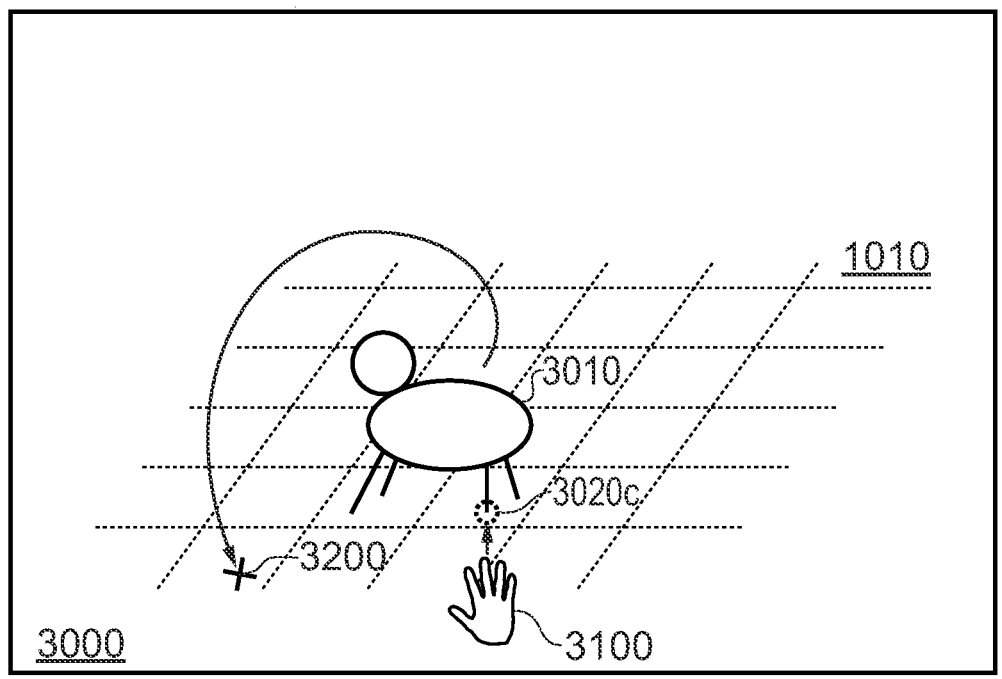
FIG. 11 is a schematic diagram of a composite image in which an object is caused to move to a new position which is substantially free from detected movement in accordance with embodiments of the present invention.

Embodiments of the invention in which the cell processor is operable to initiate movement of the virtual pet 3010 to a new position will now be described with reference to FIGS. 10 and 11. In FIGS. 10 and 11, the interaction regions 3050 and 3060 are omitted so as to aid understanding of the embodiments described with respect to FIGS. 10 and 11.

FIG. 10 is a schematic diagram of a composite image in which an object is caused to move to a new position in response to detected movement in accordance with embodiments of the present invention.

In particular, FIG. 10 shows the virtual pet 3010 on the virtual plane 1010. The composite image 3000 comprises an image region 3100 corresponding to the user's hand. The cell processor is operable to analyse the captured images so as to detect a direction of motion of the image region 3100 within the captured images. In the example shown in FIG. 10, the direction of motion of the image region 3100 is indicated by a dashed line 3110.

In embodiments, the cell processor 100 is operable to detect the direction of motion of the image region 3100 using known optical flow techniques such as the Lucas-Kanade optical flow method, or Horn-Schunck optical flow method, although any suitable optical flow method could be used. Accordingly, in some embodiments, the cell processor 100 is operable to generate an optical flow vector (motion vector) for each pixel in the captured image. Alternatively, so as to reduce overall processing resources needed to calculate the optical flow, the optical flow vectors can be calculated only for those pixels detected, by colour recognition and/or shape recognition for example, as corresponding to a real object such as a user's hand (for example, pixels corresponding to the image region 3100).

In some embodiments, the cell processor 100 is operable to calculate a mean average of the optical flow vectors corresponding to the detected object (in this example, the optical flow vectors corresponding to the image region 3100), so as to generate an average motion vector for that image region. The average motion vector can then be taken to represent the direction of motion of the image region 3100 within the captured images.

However, where the perimeter of the real object is difficult to detect (for example, where a user's hand meets their arm), or where different parts of the real object have different velocities, it may not be appropriate to use the average motion vector to represent the direction of motion of the object. Therefore, in some embodiments, the cell processor 100 is operable to detect an edge of the real object using known edge detection techniques such as Canny edge detection, although it will be appreciated that any suitable edge detection technique may be used. The cell processor 100 is then operable to detect a proximity point on the edge of the object which is closest to a contact point region, and use the motion vector associated with the pixel corresponding to the proximity point to represent the direction of motion of the object.

However, it will be appreciated that any other suitable method for detecting the direction of motion of a real object in the captured images may be used.

Once the direction motion of the image region 3100 corresponding to the user's hand has been detected, the cell processor 100 is operable to generate the new position such that it lies on the line 3110 which represents the direction of movement of the image region 3100 and which passes through the contact point region closest to the image region corresponding to the detect motion. For example, as shown in FIG. 10, the dashed line 3110 indicates the direction of motion of the image region 3100, and passes through the contact point region 3020a, which is closest to the image region 3100.

In FIG. 10, the new position is illustrated with a cross 3120. By initiating movement of the virtual pet to a new position which lies on a line representing the direction of motion of the detected image movement, the virtual pet 3010 can be caused to appear to move as though nudged by the user's hand or to back away from the detected movement.

In some embodiments, the new position is a predetermined distance from one of the contact points. Preferably, where the new position lies on a line representing the direction of motion of the detected image movement, the new position is a predetermined distance from the contact point region through which the line passes. Typically, the predetermined distance is set within the software implementing the augmented reality environment, although it will be appreciated that the user could input the predetermined distance via a suitable user interface or that any other suitable method for setting the predetermined distance could be used.

In other embodiments, the cell processor 100 is operable to cause the new position to be located along the line 3120 at a random distance from the contact point region. This helps to ensure that game actions of the virtual pet 3010 are less likely to become monotonous to a user.

In further embodiments, the cell processor 100 is operable to detect the velocity of the image region 3100 and to generate the new position 3120 so that the distance of the new position 3120 is dependent upon the detected velocity of the image region 3100. Accordingly, the virtual pet 3010 can be caused to appear to react dynamically to image motion caused by the user. If the velocity is detected as exceeding a velocity threshold, then the cell processor 100 is operable to cause the virtual pet to move to a new position as if the virtual pet 3010 has been knocked to that position, for example by simulating the virtual pet 3010 tumbling head over heels.

FIG. 11 is a schematic diagram of a composite image in which an object is caused to move to a new position which is substantially free from detected movement.

In particular, FIG. 11 shows the virtual pet 3010 on the virtual plane 1010. Additionally, as illustrated in FIG. 11, the composite image 3000 comprises the image region 3100 which corresponds to the user hand.

In order to try to ensure that the new position does not correspond to an image position comprising image motion, in some embodiments, the cell processor 100 is operable to detect static regions of the virtual image plane 101 which correspond to image regions corresponding to the virtual plane 1010 at which no image motion is detected in the captured images. Accordingly, the cell processor 100 is operable to set the new position so that it is located at an image position corresponding to a static region.

For example, as illustrated in FIG. 11, the cell processor 100 could cause the virtual pet 3010 to move to a new position 3200 in response to detected motion caused by the user's hand in the image region 3100 at a position corresponding to the contact point region 3020c.

To achieve this functionality, the cell processor 100 analyses the captured images so as to detect image motion as described above. Those images regions which are detected as not comprising image motion are flagged by the cell processor 100 as static regions. When motion is detected by the cell processor 100 at a contact point region, the cell processor 100 generates the new position such that the new position is located at an image position corresponding to a static region.

In some embodiments the cell processor 100 is operable to track the image regions which comprise motion using known techniques such as Kalman filtering so as to predict the path of the object. The cell processor 100 can then set the new position so that it is not located at an image position which corresponds to a predicted path of the object. For example, if the user waves their hand in an arc, thus causing motion to be detected in the captured images at one of the contact point regions, the cell processor 100 is operable to predict the path of the user's hand and generate the new position such that the new position does not lie on the path of the arc described by the motion of the user's hand.

This reduces the likelihood that the cell processor 100 will cause the object to move to a new position which corresponds to an image region comprising motion in the next frame, or a predetermined number of future frames, following the current image frame. If the new position does correspond to an image region comprising image motion, the virtual pet 3010 may be caused to move to another new position almost immediately, which can be computationally more expensive, as well as impairing the realism of the illusion of the augmented reality images.

As mentioned above, the virtual pet also comprises at least part of the first interaction region 3050 and at least part of the second interaction region 3060, as shown in FIG. 9. These will now be described in more detail with reference to FIGS. 9 and 12.

The first interaction region 3050 and the second interaction region 3060 are regions of the captured image in which a user can cause motion so as to interact with the virtual pet 3010. In the example shown in FIG. 9, the first interaction region 3050 corresponds to an area on the back of the head of the virtual pet 3010, and the second interaction region 3060 corresponds to an area on the top of the back of the main body of the virtual pet 3010.

In some embodiments, the cell processor 100 is operable to detect, using known techniques such as those mentioned above, image movement in the captured images at an image position corresponding to an interaction region, such as the interaction region 3050 or the second interaction region 3060. If the cell processor detects that image movement occurs in one of the interaction regions, then the cell processor 100 is operable to cause the virtual pet 3010 to perform a game action.

For example, if image motion is detected in the first interaction region 3050, for example by the user performing a stroking motion near the back of the virtual pet's head, the cell processor 100 can render the virtual pet 3010 so that it appears to arch its head back and make a suitable noise which can be reproduced via the sound output device 310. Additionally, for example, if the cell processor 100 detects image motion at an image position corresponding to the second interaction region 3060, for example by the user making a tickling motion near the top of the virtual pet's back, then the cell processor 100 is operable to cause the virtual pet 3010 to roll over onto its back, as illustrated in FIG. 12.

Figure 12:
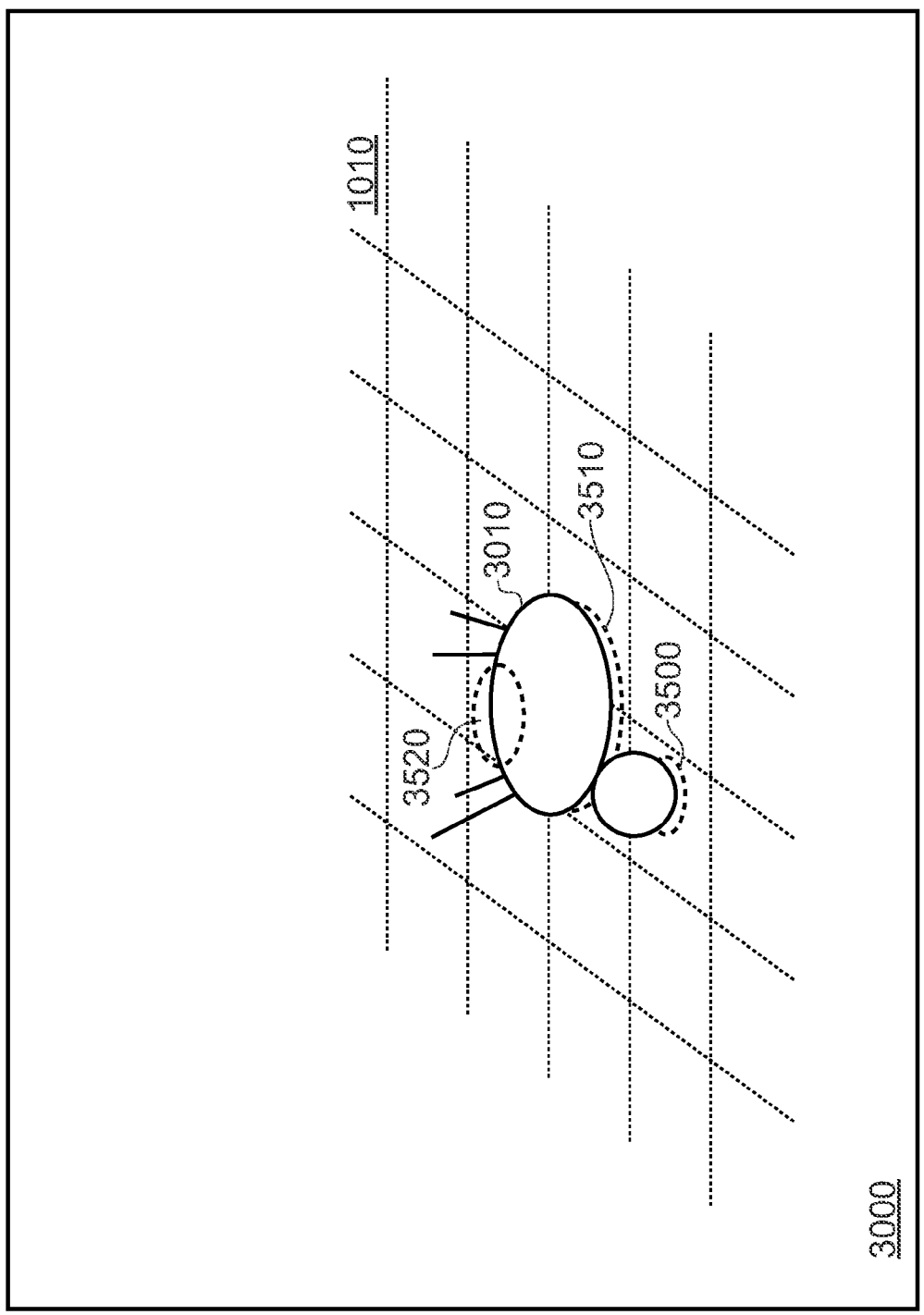
FIG. 12 is a schematic diagram of a composite image showing an object resting on a virtual plane in accordance with embodiments of the present invention.

FIG. 12 shows the virtual pet 3010 resting on its back on the virtual image plane 1010. The virtual pet 3010 is in contact with the virtual plane 1010 within a contact point region 3500, where the head of the virtual pet is in contact with the virtual plane. In the example shown in FIG. 12, the virtual pet 3010 is also in contact with the virtual image plane 1010 within a contact point region 3510. Additionally, in the example shown in FIG. 12, the virtual pet 3010 comprises at least part of an interaction region 3520.

If the cell processor 100 detects image motion at an image position corresponding to either of the contact point regions 3500 or 3510, then the cell processor 100 is operable to cause the virtual pet 3010 to move to a new position by causing the virtual pet 3010 to perform a game action such as rolling over, jumping, and then running to the new position as if startled. However, the cell processor 100 could cause the virtual pet 3010 to perform any other suitable game action in response to detection of motion in image positions corresponding to a contact point region.

In other words, the cell processor 100 is operable to detect a game state of the virtual pet 3010, and, in response to detected motion at one or more of the contact point regions, cause the virtual pet 3010 to perform a game response action which is dependent on the detected game state of the virtual pet 3010. The game state of the virtual pet 3010 can be detected by the cell processor 100 using game state parameters associated with the virtual pet 3010 which are generated by the cell processor in response to commands implemented as part of the method of implementing the augmented reality environment.

Here, "game state" should be taken to mean any attribute that may be associated with the virtual pet 3010, such as an orientation of the virtual pet 3010 with respect to the virtual plane 1010, or any other suitable variable such as position, pose, game attribute, and the like. For example, as mentioned above, the orientation of the virtual pet 3010 with respect to the virtual image plane 1010 could be such that the virtual pet 3010 is on its back, in which case the game action of the virtual pet 3010 could be to roll over, jump up, and run to the new position.

As mentioned above, the virtual pet 3010 comprises at least part of the interaction region 3520. The interaction region 3520 is similar in function to the interaction regions 3050 and 3060. Referring to FIG. 12, a user could move their hand so as to perform a tickling motion at an image position corresponding to the interaction region 3520. In response to the detected motion in captured images at an image position corresponding to the interaction region 3520, the cell processor 3520 can cause the virtual pet 3010 to perform a game action such as waggling its legs in the air, although the cell processor 100 could cause the virtual pet 3010 to perform any other suitable game action in response to detect motion in the interaction region 3520.

It will be appreciated that, where the virtual pet 3010 is referred to as comprising at least part of an interaction region, this term can also be taken to mean that the virtual pet 3010 can comprise the whole of an interaction region.

As described above, the cell processor 100 is operable to cause the virtual pet 3010 to appear to move out of image regions in which movement is detected. However, if, for example, a user places their hand near the camera 756 such that greater than a predetermined proportion of the field of view of the camera 756 is covered by the user's hand, it may be difficult to render the virtual pet 3010 in such a way as to maintain the illusion of reality.

Therefore, in some embodiments, the cell processor 100 is operable to detect whether a first image area corresponding to an image feature is greater than a predetermined proportion of a second image area corresponding to a full field of view of the camera 756. Accordingly, the cell processor 100 is operable to initiate movement of the virtual pet to an avoidance position in the composite image 3000 in response to a detection that the first image area is greater than the predetermined proportion of the second image area. Preferably, the avoidance position is a forward image position corresponding to a lower edge of the captured images, although it will be appreciated that any other suitable position within the composite image 3000 could be used. It will be appreciated that the predetermined proportion could be a percentage, ratio, or any other suitable proportion.

In some embodiments, the image feature comprises inter-image motion. In other words, the first image area corresponds to an image region comprising image movement as detected by the cell processor 100. For example, where the predetermined proportion is fifty percent, motion occurring in greater than fifty percent of the full field of view of the camera 756 will cause the cell processor 100 to initiate movement of the virtual pet to the avoidance position. However, it will be appreciated that the predetermined proportion could be any suitable proportion of the full field of view of the camera 756.

In other embodiments, the cell processor 100 is operable to store a background image representing an image captured by the camera in a calibration operation, and to subtract image pixels of the background image from image pixels of a current captured image so as to generate a foreground image. However, it will be appreciated that any other suitable method for generating a background and foreground image could be used. For example, a user's hand is likely to be detected as corresponding to a foreground image. In the embodiments in which foreground and background images are generated, the image feature comprises the foreground image. Therefore, if the user's hand occupies an image area which is greater than the predetermined proportion of the full field of view of the camera 756, the cell processor 100 will cause the virtual pet 3010 to move to the avoidance position.

In some embodiments, when the cell processor 100 causes the virtual pet 3010 to move to the avoidance position, the cell processor 100 is operable to apply a zoom operation to the image corresponding to the virtual pet so that only part of the virtual pet 3010 is visible in the composite image 3000.

Figure 13:
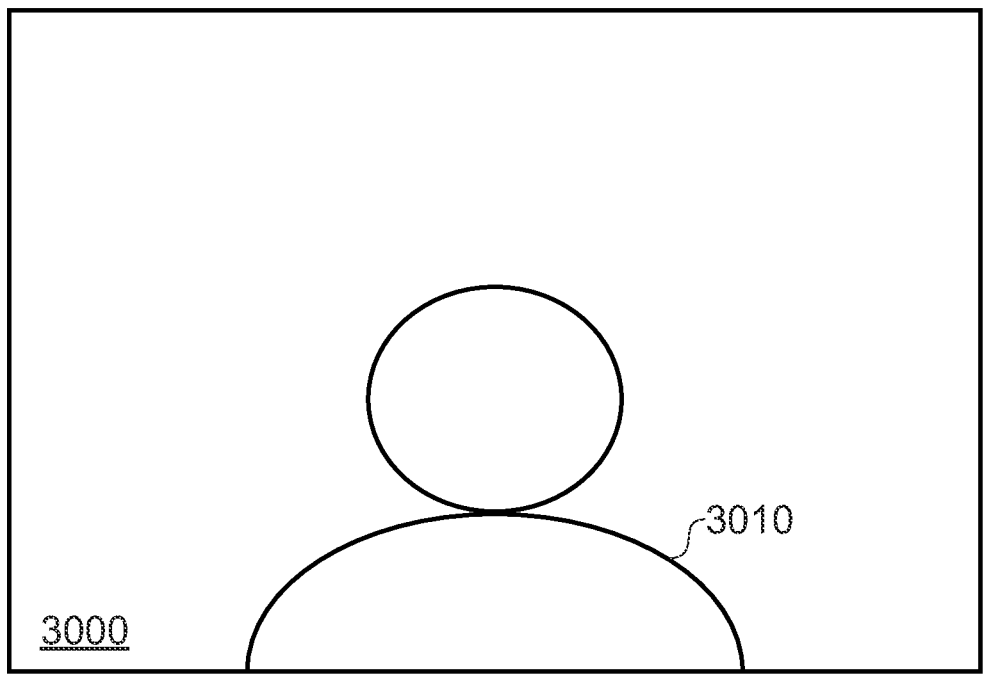
FIG. 13 is a schematic diagram of an object in an avoidance position in the composite image in accordance with embodiments of the present invention.

An example of the virtual pet in an avoidance position is illustrated in FIG. 13. FIG. 13 is a schematic diagram of the virtual pet 3010 in an avoidance position within the composite image 3000. In the example shown in FIG. 13, a zoom operation has been applied to the virtual pet 3010 so that only part of the virtual pet 3010 is visible within the composite image 3000. Additionally, the virtual pet 3010 is illustrated as being at a forward image position corresponding to a lower edge of the captured images.

The virtual pet 3010 will thus appear as if in front of any real objects within the field of view of the camera, such as a user's hand. This helps to maintain the illusion that the virtual pet 3010 is in the real environment, even if, for example, a user's hand occupies an image area which is greater than the predetermined proportion of the field of view of the camera 756. In other words, the virtual pet 3010 will appear as if "squashed" between the user's hand and the camera 756.

Figure 14:
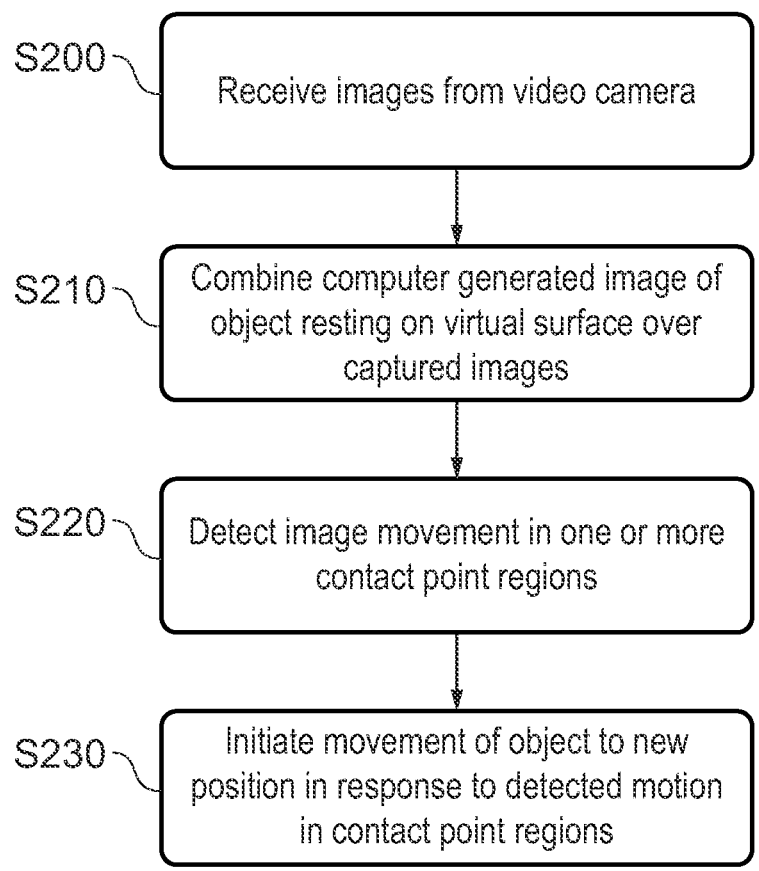
FIG. 14 is a flow chart of a method of initiating movement of an object on a virtual image plane in accordance with embodiments of the present invention.

A method of initiating movement of an object on a virtual image plane in accordance with embodiments of the present invention will now be described with reference to FIG. 14, which shows a flowchart illustrating the steps of the method.

At a step s200, images captured by the camera 756 are received at the entertainment device 10 via a suitable communications link such as WiFi, USB, Bluetooth and the like, although any suitable communications link, cable or the like could be used.

Then, at a step s210, the cell processor 100 combines a computer generated image of an object, such as the virtual pet 3010, resting on a virtual surface such as the virtual plane 1010 over the images captured by the camera 756 so as to generate the composite image 3000.

At a step s220, the cell processor 100 detects image movement in the captured images in one or more contact point regions, such as contact point regions 3020a, 3020b, 3020c, and 3020d, corresponding to image positions at which the object contacts the virtual surface.

At a step s230, the cell processor 100 initiates movement of the object to a new position with respect to the virtual surface (such as the virtual plane 1010) in response to detected motion in the contact point regions of the captured images.

Accordingly, the cell processor 100 can cause the computer generated object to appear to avoid real objects by initiating movement of the object to a new position within the captured images in response to real objects, such as a user's hand, whose motion causes image movement within the captured images. This helps maintain the illusion that the computer generated object is in the real environment.

Although the above embodiments have been described with the virtual pet 3010 as an example of a computer generated object, it will be appreciated that the above embodiments are equally applicable to any type of suitable computer generated object. For example, the computer generated object could be a virtual car, and the contact point regions could correspond to image positions at which the wheels of the car contact the virtual plane.

Furthermore, although the above embodiments have been described with reference to a virtual plane, it will be appreciated that the above embodiments may be applied more generally to any virtual surface, with the contact point regions corresponding to image positions at which the virtual object contacts the virtual surface. For example, a virtual surface could be non-planar and comprise higher areas and lower areas, for example so as to simulate undulating countryside or a mountain range. Furthermore, the virtual surface could correspond to the surface of a computer generated object such as a building, table-top, race-track, and the like. Additionally, it will be appreciated that the virtual surface need not be rigid and may be flexible such that it can be deformed, for example in response to contact with one or more other computer generated objects.

It will be appreciated that the contact point regions can correspond to any image position at which a computer generated object makes contact with the virtual surface. In other words, a contact point region can occur at an image position corresponding to where a computer generated object is positioned against the virtual surface.

It will be appreciated that in embodiments of the present invention, elements of the entertainment method may be implemented in the entertainment device in any suitable manner. Thus the required adaptation to existing parts of a conventional equivalent device may be implemented in the form of a computer program product comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

In conclusion, although a variety of embodiments have been described herein, these are provided by way of example only, and many variations and modifications on such embodiments will be apparent to the skilled person and fall within the scope of the present invention, which is defined by the appended claims and their equivalents.

The invention claimed is:

1. An entertainment device for receiving images from a video camera, the device comprising:
   a combiner operable to combine images captured by the camera with a computer-generated image of an object resting on a virtual surface so as to generate a composite image;
   a detector operable to detect image movement in the captured images in one or more contact point regions corresponding to image positions at which the object contacts the virtual surface; and
   an initiator operable to initiate movement of the object to a new position with respect to the virtual surface in response to detected motion in the contact point regions of the captured images,
   in which:
   the detector is operable to detect whether a first image area corresponding to a captured image feature is greater than a predetermined proportion of a second image area corresponding to a full field of view of the camera; and
   in response to a detection that the first image area is greater than the predetermined proportion of the second image area, the initiator is operable to initiate movement of the object to an avoidance position within the composite image;
   wherein the avoidance position is a forward image position corresponding to a lower edge of the captured images.

2. An entertainment device according to claim 1, in which the detector is operable to detect a direction of motion of the image movement in the captured images at the one or more contact points; and
   the new position lies on a line representing the detected direction of motion of the detected image movement, and which passes through the contact point region closest to an image region corresponding to the detected image movement.

3. An entertainment device according to claim 1, in which the new position is a predetermined distance from one of the contact point regions.

4. An entertainment device according to claim 1, in which:
   the object comprises at least part of an interaction region associated with the object;
   the detector is operable to detect image movement in the captured images at an image position corresponding to the interaction region; and
   the initiator is operable to cause the object to perform a game action in response to detected motion in the interaction region.

5. An entertainment device according to claim 1, in which:
   the detector is operable to detect a game state of the object; and
   in response to detected motion at one or more of the contact point regions of the captured images, the initiator is operable to cause the object to perform a game response action which is dependent on the detected game state of the object.

6. An entertainment device according to claim 1, in which:
   the detector is operable to detect static regions of the virtual image plane, the static regions corresponding to image positions which correspond to positions on the virtual surface at which no image movement is detected in the captured images; and
   the initiator is operable to set the new position so that it is located at an image position corresponding to a static region.

7. An entertainment device according to claim 1, in which the image feature comprises inter-image movement.

8. An entertainment device according to claim 1, in which:
   the detector is operable to store a background image representing an image captured by the camera in a calibration operation, and to subtract image pixels of the background image from image pixels of a current captured image so as to generate a foreground image; and the image feature comprises the foreground image.

9. An entertainment device according to claim 1, in which the initiator is operable to apply a zoom operation to the object when the object moves to the avoidance position.

10. An entertainment device according to claim 1, in which one or more of the contact point regions include a region of the virtual surface surrounding the image positions at which the object contacts the virtual surface.

11. An entertainment device according to claim 1, in which the object is a virtual creature.

12. An entertainment device according to claim 1, in which the initiator is operable to generate the new position so that the new position is at a random position with respect to the virtual surface.

13. An entertainment system comprising:

an entertainment device including:

a combiner operable to combine images captured by a camera with a computer-generated image of an object resting on a virtual surface so as to generate a composite image;

a detector operable to detect image movement in the captured images in one or more contact point regions corresponding to image positions at which the object contacts the virtual surface; and an initiator operable to initiate movement of the object to a new position with respect to the virtual surface in response to detected motion in the contact point regions of the captured images, in which:

the detector is operable to detect whether a first image area corresponding to a captured image feature is greater than a predetermined proportion of a second image area corresponding to a full field of view of the camera; and in response to a detection that the first image area is greater than the predetermined proportion of the second image area, the initiator is operable to initiate movement of the object to an avoidance position within the composite image;

a video camera operable to transmit images captured by the camera to the entertainment device via a communications link; and a display operable to display the composite image generated by the entertainment device;

wherein the avoidance position is a forward image position corresponding to a lower edge of the captured images.

14. An entertainment method comprising:

receiving images from a video camera;

combining a computer-generated image of an object resting on a virtual surface with images captured by the camera so as to generate a composite image;

detecting image movement in the captured images in one or more contact point regions corresponding to image positions at which the object contacts the virtual surface;

initiating movement of the object to a new position with respect to the virtual surface in response to detected motion in the contact point regions of the captured images;

detecting whether a first image area corresponding to a captured image feature is greater than a predetermined proportion of a second image area corresponding to a full field of view of the camera; and initiating movement of the object to an avoidance position within the composite image in response to a detection that the first image area is greater than the predetermined proportion of the second image area;

wherein the avoidance position is a forward image position corresponding to a lower edge of the captured images.

15. A tangible, non-transitory computer readable storage medium storing a computer program, the computer program, when executed by a processor, causing the processor to implement an entertainment, the method comprising:

receiving images from a video camera;

combining a computer-generated image of an object resting on a virtual surface with images captured by the camera so as to generate a composite image;

detecting image movement in the captured images in one or more contact point regions corresponding to image positions at which the object contacts the virtual surface;

initiating movement of the object to a new position with respect to the virtual surface in response to detected motion in the contact point regions of the captured images;

detecting whether a first image area corresponding to a captured image feature is greater than a predetermined proportion of a second image area corresponding to a full field of view of the camera; and initiating movement of the object to an avoidance position within the composite image in response to a detection that the first image area is greater than the predetermined proportion of the second image area;

wherein the avoidance position is a forward image position corresponding to a lower edge of the captured images.

* * * * *